Patented Jan. 15, 1935

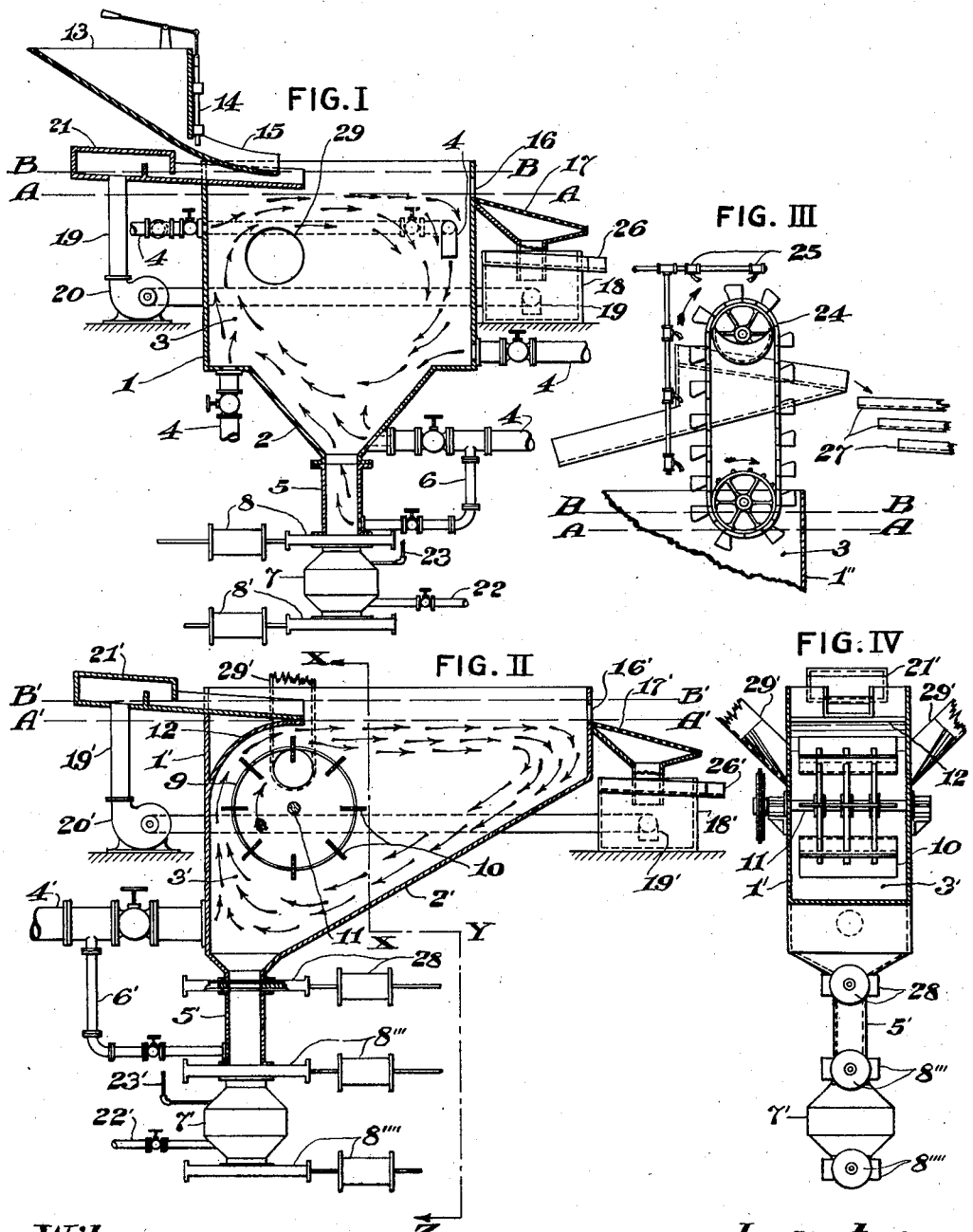

1,988,371

UNITED STATES PATENT OFFICE 1,988,371

METHOD AND APPARATUS FOR SEPARATING MATERIALS OF DIFFERING SPECIFIC GRAVITIES

Henry M. Chance, Philadelphia, Pa.

Application March 20, 1933, Serial No. 661,784

4 Claims. (Cl. 209—173)

My invention is useful in the separation of materials of different specific gravities in which separation is effected by flotation of the lighter and sinking of the heavier of said materials in a fluid medium having a specific gravity greater than that of the lighter and less than that of said heavier materials, and also in separations by a fluid medium having a specific gravity sufficient to retard the sinking of some of said lighter materials but not high enough to float all of said lighter materials.

Such fluid medium may be any suitable liquid having the desired fluidity, that is, any non-viscid liquid such as water, or non-viscid solutions of soluble salts in water, such as brine, sea-water, calcium chloride solutions and the like, or mixtures of such liquids or solutions.

My invention is also useful in the separation of materials of fluid mediums consisting of a maintained suspension in liquid of comminuted solids heavier than said liquid and substantially insoluble therein, as described in several United States patents issued to Thomas M. Chance among which are Nos. 1,224,138, May 1, 1917, 1,392,399, October 4, 1921, and Re-issue 17,873, November 18, 1930, in which such separating mediums are termed "fluid masses", and their composition and characteristics are described and defined.

My improvement consists in producing and maintaining circulation in a body of fluid medium of the described type around an approximately horizontal zone in said body. The path of travel of such circulation may be circular, elliptical, rectangular or other shape provided that there is longitudinal flow at the top, merging into longitudinal flow in a reverse direction toward the bottom, and upward flow connecting the bottom flow with the top flow, thus producing circulation in said medium.

Upon feeding materials to be separated into the top of such circulating fluid medium, said materials are by the longitudinal flow immediately transported away from the point of feed, in a relatively thin layer from which the heavier materials can quickly sink, leaving the lighter materials floating at the top of said flowing medium and are thus quickly transported to a region of discharge at one end of the separating receptacle, while the heavier materials sinking toward the bottom of said receptacle are transported by the reverse flow in the lower part of said medium to accumulate in a region from which they can readily be removed. Any of the lighter materials which by accident may be carried down into the lower part of the separating receptacle are by said reverse flow in the lower part of said medium carried into the region of upward flow and are thus raised to the top of said fluid medium and rejoin the lighter materials floating therein. The separation is thus quickly and efficiently effected.

In its application to fluid mediums comprising suspensions in liquid of comminuted solids, the larger and heavier particles of said solids tending to settle towards and accumulate in the lower part of said medium, are by the circulation established in said medium carried up to the upper part of said medium and distributed therein, while the finer and lighter particles of said solids tending to accumulate in the upper part of said medium are by said circulation carried down to said lower part thereof and distributed therein, thus maintaining uniform admixture of said comminuted solids in said suspension. The circulation thus performs these dual functions: remixing of the comminuted solids, and transportation of lighter materials from feed to discharge with transportation of heavier materials to the desired region of discharge. In addition there is also the retreatment of materials in the lower part of the medium, whereby lighter materials are recovered therefrom and returned to the top of said medium.

This latter adaptation of the method is therefore especially useful in fluid mediums used in the separation of coal from its intermixed impurities, or for the separation of other materials such as ores from gangue or other refuse, and the like.

I will describe my invention as applied to a separating fluid medium consisting of a maintained suspension of sand in water, as is commonly used in the separation of coal from its intermixed impurities, the term "sand" being used to include any comminuted solid suitable for the purpose and the term "water" being used to include any liquid, mixture of liquids or solutions of soluble salts, suitable for the production of a medium of the described type and used to effect separation by the flotation of the coal and the sinking of the heavier impurities admixed with said coal. Such description will enable those familiar with "float-and-sink" methods of separation readily to apply my invention to the separation of ores of the heavier metals from low-grade ores, gangue or other lighter refuse, to separate light ores from heavier ores, to separate non-metallic materials of differing specific gravities, either natural products such as limestone and barytes, or artificial products such as those produced in chemical or electric furnace practice, and the like.

Figure I is a vertical elevation and cross-sectional view illustrating diagrammatically circulation of the fluid separating medium produced by the energy of water introduced under pressure into said medium.

Figure II is a vertical elevation and cross-sectional view illustrating diagrammatically apparatus in which circulation is produced by an impeller having a substantially horizontal axis of rotation.

Figure III is a fragental section of a corner of a receptacle illustrating diagrammatically another means for removal of the lighter material, shown as a bucket elevator, but illustrative of the use of scraper lines, dippers, scoops, etc., for such removal.

Figure IV is a cross-section of Fig. II taken on the lines X—X—Y—Z illustrating the feeding of materials by the feed chutes 29'—29' into the interior of revolving impeller 9.

For the purposes of simplicity, the drawing shows the apparatus arranged to produce right-hand ("clock-wise") circulation in the fluid medium, but such direction is of course not essential to the operation of my invention. The direction of circulation of the fluid medium is indicated by the arrows.

It will be understood that the adjunctive appliances shown by any drawing can be used in connection with any other drawing.

In Fig. I a receptacle 1 is shown diagrammatically as a rectangular tank but may be of any suitable shape or size and is provided with a downwardly contracted extension 2 for the collection of heavier materials sinking through the fluid separating medium 3 of the described type with which the receptacle is filled. The receptacle is provided with valved inlets 4 for the admission of water, or mixed sand and water, under pressure. A classifier column 5, with valved water supply 6, connects the base of the receptacle 2, with discharge means for trapping out the heavier material, comprising slide valves and operating thrust cylinders 8, 8', with refuse chamber 7. In Fig. II circulation of the medium is produced by the revolving impeller 9 provided with vanes or paddles 10 mounted on shaft 11 which is driven from any suitable source of power supply, thus inducing circulation as shown by the arrows. A plurality of such impellers may be used arranged either in parallel or series.

A curved deflector is shown by 12 which assists in converting vertical into horizontal stream-line flow. Such deflectors are useful although not essential because the apparatus will function without them but with some loss of energy from the formation of eddy currents.

The impeller 9 with its vanes 10 may be constructed as an open skeleton structure similar to the paddle-wheels used in the propulsion of river steamboats, the vanes or paddles being carried on spiders or discs mounted on shaft 11.

As adapted to the washing of coal the separating medium 3 may be a sustained suspension in water of quartz sand of about 30—80 mesh, said medium having a specific gravity greater than that of the coal and less than that of the high-ash bony coal, slate, rock and other intermixed impurities.

The receptacle 1 is equipped with a feed pocket 13, adjustable feed gate 14, and feed chute 15. Means for removing the coal floating at the top of 3 which is indicated by the line A—A are shown by the overflow weir and desanding and dewatering screen 17 the sand settling in the sump 18 and being pumped through conduit 19 by sand pump 20, discharging into staybox 21 and thus returned to receptacle 1 and delivered adjacent to the top of the separating medium 3 at the line A—A.

The floating coal flows out through the discharge weir 16 upon dewatering and desanding screen 17, the coal going to pockets or sizing screens 27 and the sand and water to sand sump 18.

Refuse chamber 7 in addition to valved inlet 22 for water under pressure, has a valved air vent 23 to permit the escape of air.

Another type of discharge is illustrated by Fig. III as a bucket elevator 24, the buckets preferably are perforate so that fluid medium admixed with the coal may drop back into receptacle 1, assisted by water spray jets 25.

Sand and water discharged with the refuse from refuse chamber 7 may be thrown to waste or returned for reuse in receptacle 1. Water under pressure for supplying the valved inlets 4, 6 and spray jets 25 may be obtained from any available extraneous source or from sand sump overflow 26, but a certain quantity of makeup water must be obtained from some source extraneous to the apparatus.

This hydraulic method for producing circulation of the separating medium is especially well adapted to maintain admixture of the comminuted solids in suspensions such as are used in washing bituminous coals of low specific gravity. In such mediums the volumetric percentage of sand to water may be not more than 25 or 30 per cent of sand to 75 or 70 per cent of water, and the fluid medium is a relatively dilute mixture. In such mixture the falling velocity of the particles of sand is far greater than in less dilute mixtures, therefore a large quantity of upwardly rising water is required to maintain suspensions of the sand particles, and the kinetic energy of the inflowing water is by my improvement utilized to produce the desired circulation.

Such water should mainly be introduced below the fluid separating medium, as is indicated by the larger diameter of the valved inlets 4, 4, 4' located at the bottom of receptacles in Figs. I and II.

In the drawings the line B—B indicates the upper limit of a body of water overlying the separating medium, as in those embodiments of the invention utilizing the methods disclosed in United States Patent 1,392,399. These lines A—A and B—B as drawn are horizontal, but in practice neither the top of the separating medium or the overlying water are necessarily horizontal but may have a slope from point of feed towards the point at which the coal is removed or the water is being discharged.

To permit the renewal of the discharge valves, operating mechanism or refuse chamber for renewals or repairs without emptying the receptacle of the sand and water it contains a slide valve as shown by 28 in Fig. II may advantageously be placed at the top of the classifier column 5, which will be kept open when the apparatus is in use, but may be closed before stopping its operation to prevent the classifier from becoming filled with a compact mass of sand.

The fluid mass 3 in the separating receptacle should be maintained at a velocity greater than that of the stream of entering feed materials, so that these materials may be pulled away from the point of entrance and thus reduce the thickness of the floating materials.

The sand and water circulated by the sand pump 20 constitutes a secondary fluid mass which is injected directly upon the top of the fluid mass 3. This secondary fluid mass is preferably injected at greater velocity than the surface of the fluid mass 3 thus assisting in maintaining the surface velocity of that medium and by the energy of its own velocity carries the floating material more rapidly to the point of discharge, thus increasing the hourly capacity and efficiency of operation.

Figure I illustrates a preferred method of introducing the materials to be separated, shown by the mouth of a feed conduit 29 through which the material to be separated is introduced into the neutral zone through one or both side walls of the container 1.

A similar feed conduit can of course be applied to Fig. II, the material being injected into the interior of the rotating agitator 9, as shown by 29'.

If such feed conduit be used the feed chutes 15 can be removed, or used as an auxiliary feeder for coal of small size but the staybox and trough 21 will be retained for the return to the top of the separating medium 3 of the auxiliary fluid mass returned by pump 20 from sand sump 18, as illustrated by Figs. I and II, and this trough can if desired also be used for feeding materials to be separated directly upon the top of the separating fluid medium 3.

The preferred type of receptacle is a relatively long narrow trough, the open top of which is horizontal or with hydraulic gradient from feed towards discharge weir and the bottom of which is inclined downwardly towards the region of feed so that the deepest part of the receptacle is at the left end when the direction of circulation is clockwise to the right, as shown by Fig. II, but the receptacle may be of any desired shape or size as to length, depth and width.

In such a trough the separating fluid mass may have high surface velocity and thus large capacity to carry the floating material from feed to discharge. The superimposed secondary fluid mass for maximum efficiency and capacity should be passed over the separatory fluid mass in the same direction and at materially higher velocity than that of the separating mass, thus transporting the floating material at increased velocity to and through the discharge weir.

I claim:

1. Apparatus for separating materials of differing specific gravities, comprising in combination a vertically undivided receptacle adapted to accommodate a fluid separating medium of the described type, a body of said medium in said receptacle, means for creating and maintaining circulation in the periphery of said body around an approximately horizontal axis and causing a horizontally moving stream at the upper part of the medium and a reversely moving stream at the lower part of the medium, the velocity of said circulation being approximately equal in all parts of said periphery, the central portion of said body between said horizontally and said reversely moving streams being of substantial volume and free from obstructions so that material may fall through said central portion and then through said reversely moving stream without impedance, means for feeding materials to be separated into said body above the reversely moving stream whereby the sinking materials will fall in the vertically undivided receptacle and on encountering the reversely moving stream will be rid of lighter material, and means for separately removing said separated heavier materials.

2. In separating materials of differing specific gravities by flotation of the lighter and sinking of the heavier in a fluid medium having a specific gravity greater than that of the lighter of said materials and less than that of the heavier of said materials, the improved method which consists in creating and maintaining circulation within a vertically undivided body of such fluid medium around an approximately horizontal zone in said body, in causing said circulation to produce a movement of approximately horizontal translation in the region adjacent to the top of said fluid medium, in causing said horizontal motion of translation to merge into a downward motion of translation in the region adjacent to one end of said body, in causing said downward motion to merge into a reverse motion of translation in a direction toward the other end of said body, in causing said reverse translation to merge into an upward motion of translation, in causing said upward motion to merge into the approximately horizontal motion of translation first above described, whereby rotational movement of translation at substantially uniform velocity of translation is induced in the outer periphery of said body; in feeding materials to be separated into said body, in causing the lighter of said materials to float therein and be carried thereby to a point of removal and in causing the heavier materials to sink therein through said reverse translation to a point of removal, said reverse translation in passing through the sinking heavier material recovering lighter material carried downward by the sinking heavier material, and said upward translation returning the downwardly carried lighter material to said horizontal translation, in separately removing from said body the lighter and heavier materials therefrom, and in introducing a secondary fluid mass at relatively high velocity with respect to the circulation of the separating fluid mass in the same direction of travel of said separatory fluid mass and superposed upon said separatory fluid mass.

3. Apparatus for separating materials of differing specific gravities, comprising in combination a vertically undivided receptacle adapted to accommodate a fluid separating medium of the described type, a body of said medium in said receptacle, means for creating and maintaining circulation in the periphery of said body around an approximately horizontal axis and causing a horizontally moving stream at the upper part of the medium and a reversely moving stream at the lower part of the medium, the velocity of said circulation being approximately equal in all parts of said periphery, means for feeding materials to be separated into said body above the reversely moving stream whereby it may fall through the reversely moving stream and the sinking material on encountering the reversely moving stream will be rid of lighter material which will be carried by said circulation to said horizontally moving stream, means for removing the lighter material from the horizontally moving stream, means for separately removing said separated heavier materials, and means for imposing upon said separatory fluid mass a secondary fluid mass having a relatively high velocity and moving in the same direction as said separatory fluid mass.

4. Apparatus for separating materials of differing specific gravities, comprising in combination a vertically undivided receptacle adapted to accommodate a fluid separating medium of the described type, a body of said medium in said receptacle, means for creating and maintaining circulation in the periphery of said body around an approximately horizontal axis and causing a horizontally moving stream at the upper part of the medium and a reversely moving stream at the lower part of the medium, the velocity of said circulation being approximately equal in all parts of said periphery, means for feeding materials to be separated into said body above the reversely moving stream whereby it may fall through the reversely moving stream and the sinking material on encountering the reversely moving stream will be rid of lighter material which will be carried by said circulation to said horizontally moving stream, means for removing the lighter material from the horizontally moving stream, and means for separately removing said separated heavier materials, said means for creating circulation comprising a plurality of fluid discharging conduits opening tangentially of the path of circulation.

HENRY M. CHANCE.